United States Patent [19]

Johnston et al.

[11] Patent Number: 4,577,071
[45] Date of Patent: Mar. 18, 1986

[54] ECHO CANCELLER WITH ADAPTIVE RESIDUAL CENTER CLIPPER CONTROLLED BY ECHO ESTIMATE

[75] Inventors: Robert D. Johnston, Woodbridge; Nicholas J. A. Forse, Ipswich, both of England

[73] Assignee: British Telecommunications, London, England

[21] Appl. No.: 541,654

[22] Filed: Oct. 13, 1983

[30] Foreign Application Priority Data

Oct. 15, 1982 [GB] United Kingdom ................ 8229510
Jun. 1, 1983 [GB] United Kingdom ................ 8315046

[51] Int. Cl.⁴ .............................................. H04B 3/20
[52] U.S. Cl. ................................................. 179/170.2
[58] Field of Search ............. 179/170.2, 81 B, 170.6; 381/71, 93, 94, 95

[56] References Cited

U.S. PATENT DOCUMENTS 3,992,594 11/1976 Helder ............................ 179/170.6
4,282,411 8/1981 Stewart ........................... 179/170.2

FOREIGN PATENT DOCUMENTS 1295956 11/1962 France.

OTHER PUBLICATIONS

Communication and Transmission, vol. 3, No. 4, Dec. 1981, Issy-les-Moulineaux (FR), Levy: "Suppresseur d'Echo et Annuleur d'Echo pour Circuits Telephoniques", pp. 19-30.

NTC '77 Conference Record, vol. 1, Dec. 5-7, 1977, Los Angeles, New York (US), O. A. Horna: "Echo Canceller Utilizing Pseudo-Logarithmic Coding", pp. 04: 7-1-04: 7-8.

Primary Examiner—Gene Z. Rubinson
Assistant Examiner—R. Vaas
Attorney, Agent, or Firm—Cushman, Darby & Cushman

[57] ABSTRACT

Residual noise control is provided on telecommunications links which are at least partly 4-wire, by means of a variable threshold center clipper 30 applied to the output of an echo canceller 100. The threshold of the center clipper 30 is varied in accordance with the magnitude of an echo estimate 21 generated by the echo canceller 100.

In order to prevent mutilation of near end speech the clipper is disabled when such speech is detected. However, the echo canceller 100 remains in circuit to allow control of echo even during doubletalk.

The clippers threshold may be controlled in response to the instantaneous modulus of the echo estimate. Alternatively, the echo estimate may be fed to a modular 60 and filter 55 to provide a short term filtered version of the echo estimate which allows control of other components of residual noise.

17 Claims, 4 Drawing Figures

ECHO CANCELLER WITH ADAPTIVE RESIDUAL CENTER CLIPPER CONTROLLED BY ECHO ESTIMATE

This invention relates to noise control circuits, and in particular to noise control circuits for reducing signal dependent noise levels in telecommunications networks.

One of the primary sources of signal dependent noise in telecommunications networks is echo.

Echo is a delayed usually attenuated replica of the transmitted signal which is returned to the transmitter. Echo occurs in telecommunications links having separate receive and transmit channels, and is usually due to imperfect impedance matching of the channel terminations. The terminations are usually in the form of hybrids (sometimes referred to as hybrid transformers) which provide the transition between so called 4-wire and 2-wire links. (For historical reasons, links having separate receive and transmit channels are generally referred to as 4-wire, while those in which a single channel carries transmissions in both directions are referred to as 2-wire, irrespective of the nature of the actual transmission medium, eg co-axial cable or radio. The expressions 4-wire and 2-wire as used in this specification are therefore not to be understood as being limited to communications links employing wires.)

Long distance telecommunications links are by means of 4-wire circuits, and they are also used for various local connections such as between major exchanges. However, subscriber's telephones are connected to the network by means of 2-wire links. At the transitions between 2-wire and 4-wire circuits devices called hybrids (hybrid transformers or their equivalent) are used to adapt one circuit type to the other. Ideally, the hybrid should direct all the signal from the receive channel of the 4-wire circuit to the 2-wire circuit, with no leakage to the transmit channel. To achieve this would require perfect matching of the impedances on either side of the hybrid. In practice the matching is hardly, if ever, perfect and some signal always leaks from the receive channel to the returning transmit channel via the hybrid. Typically, the loss across the hybrid, between the receive and transmit channels, is in the order of 8-18 dB. It is this signal leaking from the receive to the return path that constitutes echo.

The subjective effects of echo increase as its intensity (loudness) and its delay increase.

On short links, where the total round trip time is less than about 40 ms, echo is not normally a serious problem on speech circuits, as the person talking perceives the echo signal as sidetone. (Sidetone is the sound in the ear piece of the telephone users own voice which is heard when speaking into the mouthpiece. It is not delayed relative to speech, and is deliberately introduced so that the speaker is aware of the loudness of his own voice.)

Above 40 ms delay time, the leakage signal is perceived by the telephone user as echo which interferes with speech. The aim of echo control is to increase the loss (or separation) between the receive and return channels, ideally to the point of complete removal of the echo signal. Current estimates of the loss needed are in the order of 40 dB.

For links of less than about 3,000 km echo may be controlled adequately by the deliberate introduction of losses into the signal path. As the desired signals only experience the loss once, and the echo experiences it twice, the signal-to-echo ratio is improved.

For links of more than about 3,000 km such deliberately introduced losses would make the desired signals too weak and it is necessary to provide other means of controlling echo. There are two types of circuit which are used for controlling echo; echo suppressors, and echo cancellers. An echo suppressor is, in essence, just a voice operated switch. While one party speaks into his transmit channel, which is of course the second party's receive channel, the signal level on the second party's transmit channel is monitored. If this monitored signal level is less than a certain predetermined threshold, it is taken to consist solely of echo and the channel is disconnected, thereby preventing passage of echo. Clearly the choice of an appropriate threshold level is of considerable importance to the subjective quality of the system. If the threshold is set too low, whenever there is a large echo signal or other large noise signal the suppressor will treat that signal as speech and allow it through. Conversely, if the threshold is set too high, although even high echo levels will not be transmitted, low level speech signals will also be blocked. Furthermore, a high threshold will also mutilate the front end of any speech coming from the second party, there will be a tendency for the front end of all such speech to be blocked. The situation is made worse by the fact that suppressors must rely on average energies when making a threshold decision, which means that there is a time constant associated with the determination of signal level. Typically echo suppressors measure energies for about 50-60 ms, which means there is at least this much of a delay between changes of state.

Echo cancellers monitor the signal on the receive channel, model the real echo path, and use this model to produce an echo estimate. The echo estimate is subtracted from the signal on the return channel. This is usually done by producing a negative echo estimate and adding this to the signal on the return channel. This part of the echo cancellation process is often referred to as subtraction.

Echo cancellers have the advantage over echo suppressors in that they allow control of echo even during double talk, i.e. when both ends are speaking. Also, because cancellation does not rely on blocking of the return channel and the use of a threshold, there is less disruption of the front end of the second party's speech. These advantages are somewhat offset by the relatively high cost and complexity of cancellers. A discussion of the problems of echo and the use of echo cancellers and suppressors can be found in a paper by D L Duttweiler in IEEE Spectrum, October 1980, pages 34-37.

Even when an echo canceller or echo suppressor is used, unwanted signals of some form generally remain. In this specification, the term residual signals will be used to refer to these signals. With an echo suppressor these signals can be for example those let through when the noise level is above the threshold or those in the period after the end of near end speech but before the suppressor has detected the change in signal level. Such signals constitute objectionable noise which greatly lowers the subjective quality of the echo control. Echo cancellers often allow some residual echo to pass, as the model of the echo path is not exactly the same as the real echo path. Most cancellers are provided with feedback by means of which the echo estimation can be improved, but such feedback is generally inefficient when the errors are due to non linearities in the real echo path which vary rapidly. Known echo cancellers do not remove noise due to intermodulation or harmonic distortion superimposed on the echo, and this constitutes part of the residual signal.

In order to provide satisfactory echo control it is necessary for the residual signals to be at a low level and to be non intrusive. Generally, the approach to this problem has been to develop echo cancellers capable of providing greater and greater losses, with the idea of reducing the residual signal to an acceptably low level. Currently loss of about 40 dB is considered to be a desirable and attainable goal.

In addition to the residual signals mentioned above, which are likely to be a problem on virtually any circuit on which cancellation or suppression is used, on circuits in which there is analogue to digital conversion there is a problem with quantising noise.

Quantizing noise is noise added to an analogue signal when it is converted to a digital signal, and it is not removed during subsequent reconversion from digital to analogue. It is unavoidable, as the process of converting a signal which may have an infinite number of levels (an analogue signal) into one with a finite number of discrete levels (a digital signal) must introduce a misrepresentation. This misrepresentation and hence the noise may be reduced by increasing the number of levels in the digital system. However, in any system the number of levels is limited by the available band width. Further information on quantizing noise may be found in chapter 7 of the book entitled "Signal Processing, Modulation and Noise" by J A Betts, published by The English Universities Press, London, 1972.

Quantizing noise which is introduced during analogue to digital (A/D) conversion of a signal between a first and a second person is not generally a problem. There are normally sufficient levels in the digital system for the quantizing noise to be at quite a low level, and it is masked by the first person's speech which is at a considerably greater level than the quantizing noise. However, it has recently been found that quantizing noise introduced when the echo is quantized on the return channel is not removed by conventional echo cancellers and remains as an intrusive residual noise. This quantization noise, which is due to the echo, is intrusive firstly because it is dependent on the signal on the receive channel in the same way that echo is. Secondly, after echo cancellation there should be only a minimal signal on the transmit channel, and that is insufficient to mask the quantization noise. Little appears to have been done about controlling such quantization noise which is likely to become a greater and greater problem as the number of digital circuits increases.

Our invention is based upon findings from some recent experimental work which we have carried out. This work has shown that the actual operational performance of a canceller is limited by the line performance and that the performance of a canceller "on paper" may bear little relation to the performance of that canceller when installed. We have found that it is not necessary for the canceller to provide large losses. Improved results may be obtained by means of a canceller providing a moderate amount of loss together with an arrangement to control the residual signal. In accordance with these findings we have developed an improved arrangement for the control of quantizing noise and other residual signals which may be used in association with a canceller providing only a moderate amount of loss.

It is an object of the present invention to provide an arrangement for controlling noise, and in particular signal dependent noise on telecommunication links having separate transmit and receive channels.

According to the present invention there is provided a noise control circuit for use in a telecommunications link having separate receive and transmit channels, comprising an echo canceller and an adaptive clipper wherein an echo estimate produced by said echo canceller is used to control, via signal processing means, the threshold of said adaptive clipper.

Preferred embodiments of the invention will now be described by way of example only with reference to the accompanying drawings in which.

Figure 1:
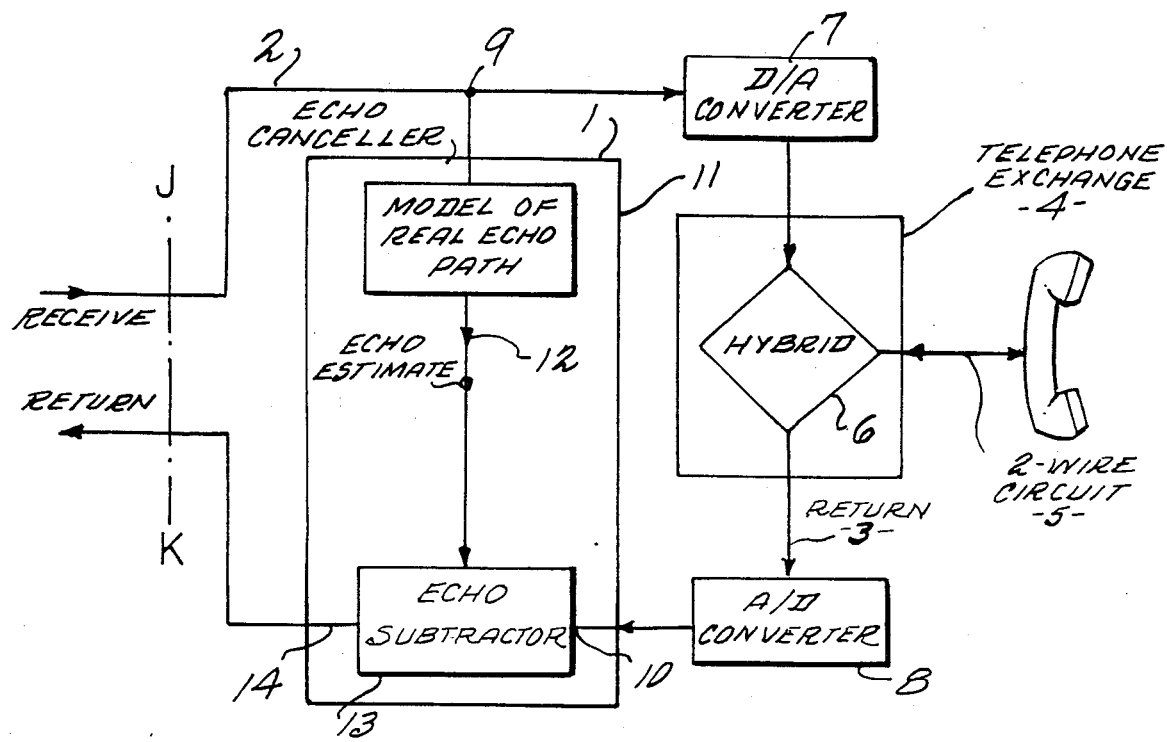
FIG. 1 shows diagrammatically a prior art echo canceller arrangement at a termination of a 4-wire telecommunications link.

FIG. 1 shows a prior art echo canceller arrangement. The echo canceller 1 is connected between the receive 2 and return 3 channels at the termination of a 4-wire link. In this example the 4-wire link is on the trunk side of a telephone exchange 4, and is connected to a subscriber's 2-wire circuit 5 by means of a hybrid 6 located in the exchange. The end of the link shown in the figure, that is the subscriber on line 5, will be referred to as the near end. The opposite end will be referred to as the far end.

The echo canceller operates on the digitized signals, monitoring the receive channel signal Sc at point 9 which is at the far-end side of D/A convertor 7. Similarly subtraction of the echo estimate takes place at point 10 on the return channel on the digital side of convertor 8. The figure shows only the near end of a 4-wire link, a similar arrangement would also be installed at the far end of the link, to the left of the broken line J-K.

The 4-wire link carries digital signals, and the 2-wire link carries analogue signals. The digital signals on the receive channel 2 are demodulated at D-A convertor 7. An analogue to digital (A-D) convertor 8 on the return channel digitizes the near-end signals.

For clarity, the echo canceller is shown as consisting of 2 parts, although in practice they are combined in one unit. The first is that part 11, which models the real echo path and which uses the receive channel signal Sc from point 9 to produce an echo estimate 12. The second part is the echo subtractor 13 which subtracts the echo estimate 12 from the return channel signal at point 10. As previously explained, the echo canceller leaves a residual signal 14 under virtually all circumstances. One source of residual signal which is shown in the figure is A/D convertor 8.

The echo canceller will not remove this extra noise, the quantization noise, generated by quantization of the echo signal at the A-D converter 8. The quantization noise remains as an objectionable interference for the far end subscriber. Quantizing noise and echo are not the only form of signal dependent noise, other non linearities in the real echo path give rise to noise. In the case of intermodulation or harmonic distortions being superimposed on the real echo the noise is not necessarily instantaneously dependent on the amplitude of the signal (as is the case with quantizing noise) and it is not controlled by known echo canceller arrangements.

Figure 2:
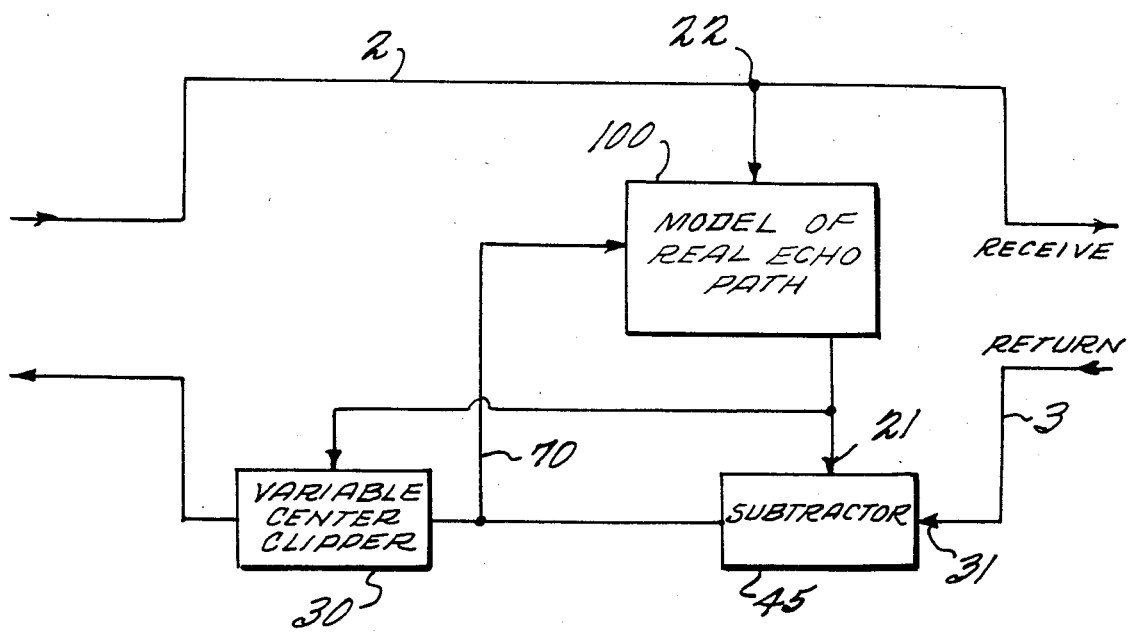
FIG. 2 shows diagrammatically a noise control circuit according to the present invention.

FIG. 2 shows a noise control circuit according to the present invention. It consists essentially of an echo canceller 100 with its associated subtractor 45 controlling a variable clipper 30. This control may be on a sample by sample basis. The canceller and subtractor are arranged coventionally, with the echo canceller 100 modelling the real echo path to produce an echo estimate 21 based on its monitoring of the signal on the receive channel at 22. This echo estimate 21 is subtracted from the signal V on the return channel at 31, by means of the subtractor 45. This subtraction may be carried out either by adding a negative echo estimate or by subtracting a positive estimate. For the sake of brevity, the term subtractor is used throughout this specification to refer both to adders, in which a negative echo estimate is utilized, and to subtractors in which a positive echo estimate is used. In addition to these conventional canceller elements, there is an adaptive center clipper 30 arranged to clip the output of the subtractor 45. A center clipper is a device which removes or 'clips' signals up to a certain threshold level, allowing only those peaks of a signal in excess of this threshold to pass. In an adaptive clipper this threshold is variable in accordance with some control signal. This clipper 30 is also supplied with the echo estimate 21. The instantaneous modulus of the echo estimate is used to control the clipper's threshold. It is assumed in this arrangement that the error between the echo estimate and the real echo is a function of amplitude (as is the case with companded and quantized signals) and that upper limits for this error can be established for each sample. The clipper's threshold can be set at about this upper value and should effectively control 'residual' noise. Under perfect conditions and when there is no doubletalk, the output from the subtractor 45 should be zero, as all the echo should have been cancelled. This ideal situation seldom arises, and the subtractor's output generally consists of residual noise, due perhaps to some non linearity in the real echo path which has not been modelled by the canceller. There may for example be several D/A convertors after the sampling point 22 on the receive channel, and the noise from these is unknown to the canceller 100 and may not be removed by the subtractor.

It is conventional for there to be some kind of error correcting feedback for the canceller by means of which the model of the echo path is updated to provide a better echo estimate. However, previously even when error correcting feedback was provided, the subtractor's output would consist of residual echo and other noise which would be passed on the return channel. The arrangement shown in FIG. 2 acts to prevent the transmission of such residual noise. Feedback may be used, for example, wherein the subtractor's output may be fed to the echo canceller (as shown by the broken line 70) and used to improve the echo estimate. This should give rise to reduced residual echo levels and hence allow the clipper threshold to be set lower. However, this approach is likely to require a complex, and hence expensive, canceller. The same overall loss may be more cheaply and easily provided with a simple canceller. As the clipper threshold is adjustable to cover the residual signal, the magnitude of this residual signal is relatively unimportant as long as the echo estimate fed to the clipper is of the right order. With a large residual signal (which may be due to a poor canceller, or to poor hybrid performance) the clipper level is set high, whereas when the canceller is working well and there is no residual signal the clipper is unused.

This arrangement allows least disturbance of near end speech, break-in (i.e. start of speech transmission) is easy, and mutilation of the front end of near end speech is kept to a minimum. The clipper is disabled while there is near end speech.

Figure 3:
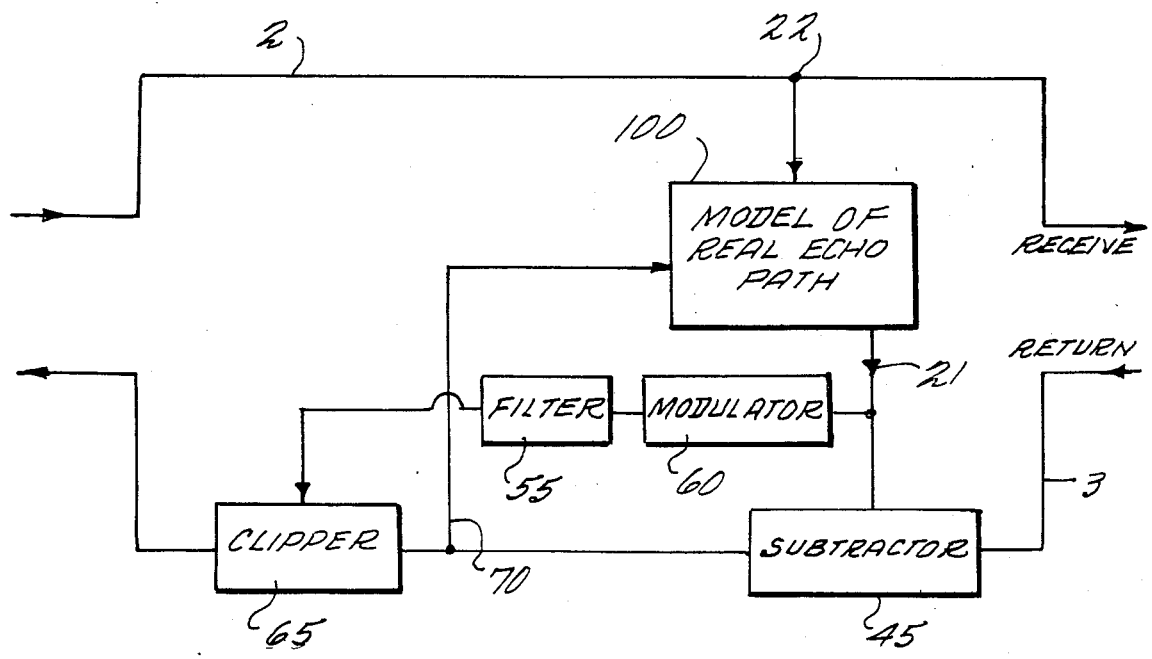
FIG. 3 shows diagrammatically a noise control circuit according to the present invention which has additional features.

In a real echo situation not all noise is necessarily instantaneously dependent upon the amplitude of the signal, but may still be estimated from the envelope of the signal. An example of this may be found when intermodulation or harmonic distortion is superimposed on the 'real' echo. FIG. 3 shows how the problems of such noise may be overcome by providing a certain amount of filtering which is included in the center clipper control path. The echo estimate from the canceller is fed to a subtractor 45 as usual, but in addition it is fed to a modulator 60. The modulator's output is passed to a filter 55 which stores a number of pulses from the modulator. The largest of these stored pulses is used to control the clipper.

One method of filtering which has proved simple to implement and effective in operation is to store the last 'N' (typically 50) samples of the echo estimate and use the largest of these as an estimate of the echo level. Attenuating this and using the resultant level to drive the clipper 65 provides residual echo control.

It should be understood that although the present invention has been described with reference to digital systems its use is in no way limited to such systems, the invention being equally applicable to both analogue and digital circuits.

The present invention is particularly suited for use at the junctions of national and international circuits, where, because of the large distances involved, echo and noise are generally troublesome. The junctions between satellite circuits and land circuits also tend to have serious echo/noise problems as a delay of about 130 ms is introduced in each leg of the satellite/earth earth/satellite link, and may similarly find use for the present invention.

There is a further application of the present invention in the control of sidetone in operator's telephone equipment.

It is a fairly common experience for telephone users talking to a telephone operator at the far end to find the operator's speech level very low. This happens when an operator is speaking over poorly matched lines because the amount of sidetone the operator receives is uncomfortably high. As the operator is unable to adjust his earpiece position he twists the microphone away from his mouth, and the level of speech going to line drops considerably. In the past much effort has been directed towards optimizing the match at the hybrid but it has not been particularly successful. The use of a noise control circuit according to the present invention allows an estimate of the impulse response of the troublesome sidetone path to be made. The circuit may be used to model the real sidetone path and this model used to predict the sidetone coming back to the operator in the same way that the real echo path is modelled when producing an echo estimate. However as total cancellation of sidetone is generally neither necessary nor desirable an additional signal path may be provided to allow a controlled amount of sidetone to pass to the operator's earpiece. It is also possible to include speech detectors to prevent the system adapting during doubletalk conditions.

A still further application of the present invention is to the control of the effects of feedback between the loudspeaker and microphone of a loudspeaking telephone. Loudspeaking telephones, like most other telephones, have separate wire pairs for the loudspeaker and for the microphone. Also like other telephones they are generally connected to the telecommunications network by means of a 2-wire link. Within telephone instruments there is, therefore, generally a hybrid to interconnect the 4-wire circuit of the telephone to the 2-wire circuit of the network. In conventional telephones acoustic feedback from the earpiece to the microphone is generally not a serious problem. However, in loudspeaking telephones if both the loudspeaker and microphone circuits are connected simultaneously there will normally be a very strong acoustic couple between them and this will cause very serious echo to the party at the far end. Also, if the loudspeaker and microphone are connected simultaneously there is a possibility that any leakage across the hybrid from the microphone circuit to the loudspeaker circuit would complete a feedback circuit for the near end signals which would lead to instability. For these reasons the current generation of loudspeaking telephones incorporate voice operated switches (which are analogous to suppressors) which connect either the loudspeaker or the microphone circuit, as appropriate. Unfortunately, the subjective effects of this voice switching are objectional to the parties at both ends. In an attempt to improve upon the subjective quality of present loudspeaking telephones, the next generation of loudspeaking telephones are to incorporate echo cancellers. However, the relatively long delays which are likely to be encountered in the acoustic path between the loudspeaker and the microphone means that any conventional echo canceller used to control echo via this path must be very complicated if it is to provide satisfactory control. The present invention may be associated with echo cancellers incorporated in loudspeaking telephones in the same manner that it may be used to control echo on other 4-wire links. As the present invention allows the use of simpler and hence smaller and cheaper cancellers for a given performance it is particularly suitable for use in loudspeaking telephones where the size and cost of the echo canceller are primary considerations.

Figure 4:
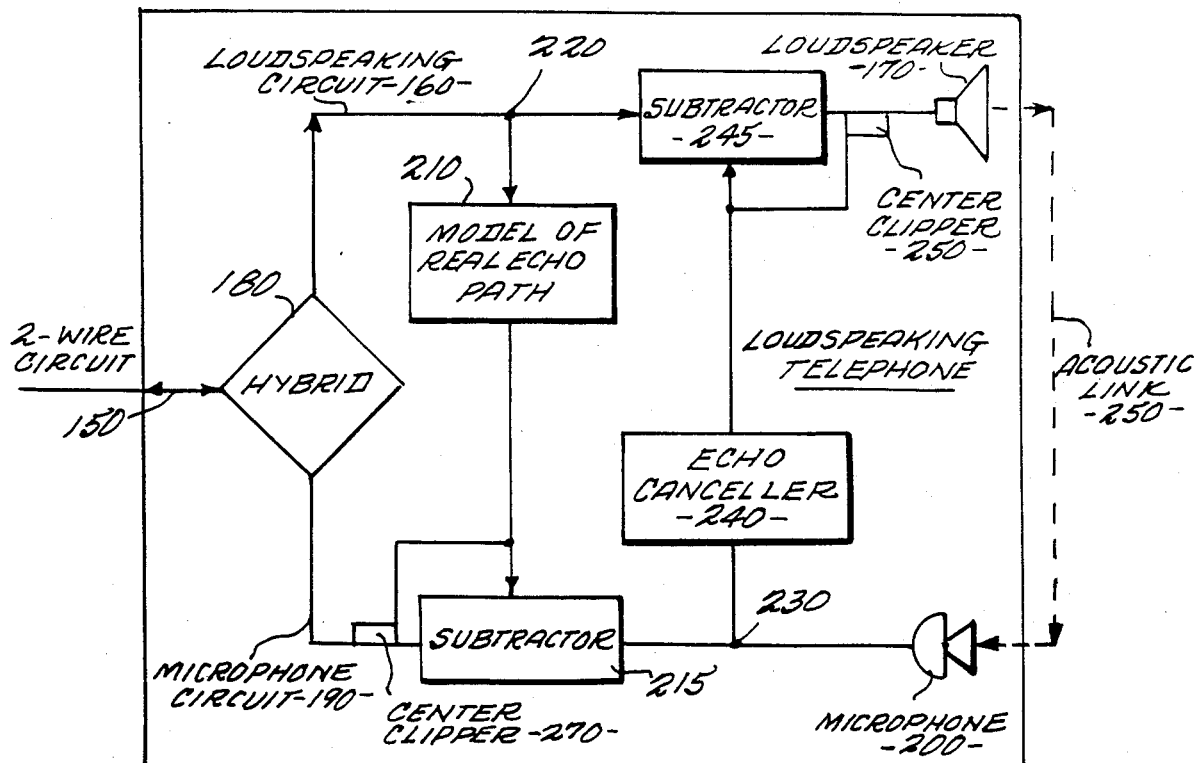
FIG. 4 shows diagrammatically the application of the present invention to a loudspeaking telephone.

FIG. 4 is a schematic diagram of a loudspeaking telephone, and shows how echo cancellers may be incorporated. In the figure the telephone 140 is connected to a 2-wire circuit 150 via a hybrid 180. The hybrid 180 matches the 2-wire circuit 150 to the 4-wire circuit comprising the loudspeaker circuit 160 which feeds the loudspeaker 170, and to the microphone 2-wire circuit 190 which connects to the microphone 200. The broken line 250 represents the acoustic link between the loudspeaker 170 and the microphone 200. When the far end party is speaking echo may be caused by signal passing from the loudspeaker to the microphone. For this reason, in conventional loudspeaking telephones voice operated switches (not shown) are provided to ensure that the echo path is broken. In the Figure two echo cancellers have been provided to control the two signal paths. Echo canceller 210 and its subtractor 215 operate to remove signal which would otherwise be echo for the far end. Canceller 210 monitors the signal on the loudspeaker circuit 160 at point 220, and produces an echo estimate which it removes from the microphone circuit 190 with the subtractor 215. Similary, echo canceller 240 controls the signal which leaks through the hybrid 180 from microphone circuit 190 to loudspeaker circuit 160. The echo canceller 240 monitoring the signal at point 230 on circuit 190 and feeding its echo estimate to subtractor 245 on the loudspeaker circuit. The diagram also shows center clippers 260 and 270 associated with cancellers 240 and 210 respectively. These centre clippers operate with the cancellers as has been described above with reference to FIG. 2 or FIG. 3. It is possible that only one canceller (210), i.e. that to control echo to the far end, may be needed if leakage through the hybrid can be kept to a sufficiently low level.

We claim:

1. A noise control circuit for use in a communications link having separate receive and return channels, said circuit comprising:
   an echo canceller means for connection to said receive channel and producing an echo estimate signal;
   an adaptive clipper means connected to process return channel signals; and
   a signal processing means connected to control a threshold level of said adaptive clipper in response to said echo estimate signal.

2. A noise control circuit as claimed in claim 1 wherein said signal processing means includes a filter means for passing a peak value of said echo estimate signal to control said clipper means.

3. A noise control circuit as claimed in claim 1 or claim 2 wherein said signal processing means produces short term samples of said echo estimate for use in controlling said threshold.

4. A noise control circuit as claimed in claim 3 wherein said signal processing means operates to select the largest of said samples from amongst a number, N, of previous samples.

5. A noise control circuit as claimed in claim 4 wherein said largest sample is used to control the threshold of said adaptive clipper.

6. A noise control circuit as claimed in claim 4 wherein N is between 10 and 100.

7. A noise control circuit is claimed in claim 1 or 2 wherein said echo canceller means includes an echo subtractor means by which said echo estimate is utilized to remove echo from said return channel signals, the output from said echo subtractor means being used as a feedback signal to improve the accuracy of the echo estimate signal.

8. A noise control circuit as claimed in claim 1 or 2 in which the echo canceller means together with its associated echo subtractor means contributes a loss of no more than 20 dB.

9. A noise control circuit as claimed in claim 1 or 2 wherein said 4-wire telecommunications link is a digital link.

10. A noise control circuit as in claim 1 or 2 wherein the amount of sidetone fed to an earpiece is controlled by the control circuit.

11. A noise control circuit as in claim 1 or 2 further comprising an additional signal path connected to allow a controlled amount of sidetone to be fed to an earpiece.

12. A noise control circuit as claimed in claim 1 or 2 positioned at a junction of a national and an international telecommunications circuit.

13. A noise control circuit as claimed in claim 1 or 2 positioned at a junction between a satellite and a land circuit.

14. A loudspeaking telephone having loudspeaker and microphone circuits and which comprises:
    an echo canceller means connected for producing an echo estimate signal; and
    an associated adaptive clipper means using a threshold level controlled by said echo estimate produced by said echo canceller.

15. A loudspeaking telephone as claimed in claim 14 wherein said echo canceller means monitors a signal on the telephone's loudspeaker circuit, and said adaptive clipper means is arranged to clip a signal on the telephone's microphone circuit.

16. In an echo canceller providing an echo estimate signal and having a residual center clipper having a controlled threshold, the improvement comprising:
    control means connected to control the threshold of the center clipper in response to the echo estimate signal.

17. A method for cancelling residual echo signals in a two-way telecommunications link, said method comprising the steps of:
    monitoring a receive signal passing along said link in a first direction and deriving an echo estimate signal in response, at least in part, to said receive signal;
    center clipping a return signal passing along said link in a second direction in response to said echo estimate signal.

* * * * *